C. E. WHITE.
HARROW.
APPLICATION FILED MAY 29, 1908.
1,046,921.
Patented Dec. 10, 1912.
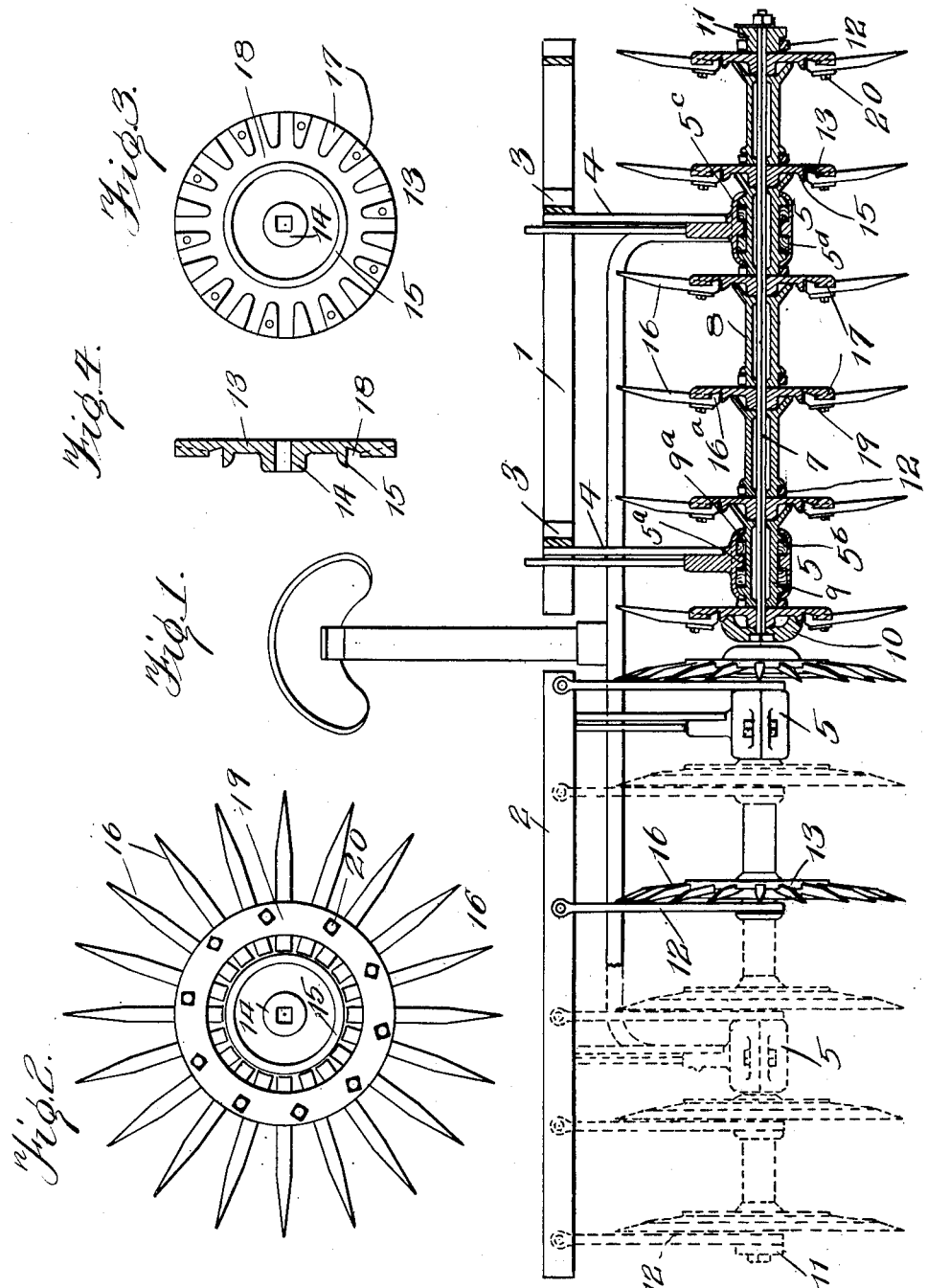

UNITED STATES PATENT OFFICE.

CHARLES E. WHITE, OF MOLINE, ILLINOIS, ASSIGNOR TO DEERE & MANSUR COMPANY, A CORPORATION OF ILLINOIS.

HARROW.

1,046,921.   Specification of Letters Patent.   Patented Dec. 10, 1912.

Application filed May 29, 1908. Serial No. 435,828.

*To all whom it may concern:*

Be it known that I, CHARLES E. WHITE, a citizen of the United States, residing at Moline, in the county of Rock Island and State of Illinois, have invented certain new and useful Improvements in Harrows, of which the following is a specification, reference being had therein to the accompanying drawing.

This invention relates to harrows which are adapted for the renovation of alfalfa, or other crops of a similar character.

In implements of this character use is made of disks with outwardly extending spike teeth. These toothed disks or heads are arranged in gangs and roll over the ground in much the same manner as do the disks of the ordinary disk harrow, their action, however, being quite different.

The object of my invention is to improve the construction of the heads and also the method of mounting the heads and the scraper bars with which the heads are provided.

In the accompanying drawing, which illustrates a practical embodiment of my invention, Figure 1 is a rear elevation of the harrow, the right gang of tools being shown in section. Fig. 2 is a face view of one of the heads. Fig. 3 is a face view of the head disk, and Fig. 4 is a central sectional view of said disk.

The frame of the implement is preferably of the disk harrow type in which two gang frames are pivotally connected to the draft bars, and are provided with means to effect their angular adjustment in relation to the line of draft. Inasmuch as this type of frame is well known, I have shown in the drawings only the main frame parts directly associated with the tool gangs.

Each of the gang frames comprises transverse bars 1 and 2 which are united by angle bars 3. Depending bars 4 are secured to the bars 3 and at their lower ends carry the bearing boxes 5, 5 of the tool gangs Each tool gang comprises a plurality of heads or toothed disks which are mounted on a gang bolt 7, and maintained in suitable spaced relation by spools 8, 9. The spacing spools 9 are specially constructed to receive the bearing boxes 5, being formed with outturned flanges 9ª between which and a central flange 5ª of the boxes are mounted wooden bearing rings 5ᵇ. The bearing boxes are preferably formed in two parts 5ᶜ and 5ᵈ, the former having an up-standing extension to which the depending bar 4 is bolted.

The inner head carries a bumper 10 secured in position by the gang bolt in the usual way, and between the outer head and the nut of the gang bolt is mounted a flanged collar 11, designed to receive the lower end of one of the scraper bars 12, one of which is provided for each of the heads. These scraper bars are secured at their upper ends to the transverse bars 1 of the gang frames and at the lower ends are bent partially around the spacing spools 8, 9, flanges 8ª being formed on the spools to maintain the scraper bars in position adjacent the disks. This construction is somewhat varied in the case of the spacing spools 9 where the ends of the bearing boxes 5 serve to prevent displacement of the scraper bars. Also, in the case of the outside scraper bars, the flanged collars 11 above referred to serve to hold the bars in position.

Referring now to the construction of the tools proper, it will be noted that each of the heads comprises a disk part 13, having a hub 14 with a square hole to receive the gang bolt. One face of the disk is plain but on the other face is formed a continuous circular flange 15 which serves as an abutment for the inner ends of the spike teeth 16, the latter being disposed between the laterally extending lugs 17 which the disk carries at its periphery. Between the annular flange 15 and the lugs 17 the face of the disk is formed with an inclined or beveled groove or depression as indicated at 18, and the teeth 16 at their inner ends have beveled lateral extensions 16ª designed to enter the said depression at 18. The teeth are secured in position by means of a ring 19 and bolts 20.

It will be seen that when the ring is clamped tightly against the sides of the teeth that the latter are held rigidly in position, circumferential displacement being prevented by the lugs 17, and radial displacement by flange 15 and the engagement of the tooth extension 16ª with the depression 18. At the same time, any individual tooth may be easily removed, in the case of breakage or for repairs, by loosening some of the adjacent clamping bolts 20. By reason of the beveled form of the groove 18 and the teeth extension 16ª, the clamping pressure of the ring 19 tends to draw the teeth inward against the flange 15 and hold them securely against play. When the bolts have thus been loosened the clamping ring 19 can, by using an adjacent tooth as a pry or lever, be sprung sufficiently to permit the withdrawal of the tooth in question.

The surface of the disk intermediate the lugs 17 is preferably inclined to the disk axis as shown so as to give the teeth a slight outward cant.

It will be understood that all of the heads, spacing spools and the gang bolt of each gang rotate in unison, the whole system having bearing supports in the boxes 5.

What I claim is:—

1. In an improvement of the class set forth, the combination with the head comprising a disk having a circumferential series of laterally extending lugs and a circular groove, a plurality of individually detachable teeth disposed between said lugs and extending radially from the disk and having a slight offset engagement with the groove thereof, the offset being in the direction of the axis of the disk, and common means comprising a ring and bolts coöperating with the said offset engagement to clamp the teeth to the disk, of the axle on which the head is mounted, and means on the axle engaging the said disk on each side to retain the head in position.

2. The spike toothed head comprising in combination, a disk having on one face a circular series of regularly spaced lugs and a circular groove concentric with said lugs, a series of individually detachable radially extending spike teeth disposed between the said lugs and adapted to be withdrawn endwise between said lugs, each tooth having a lateral extension to engage the groove of the disk, and means comprising a ring for clamping the teeth rigidly to the disk.

3. The spike toothed head comprising in combination, a disk having on one face a circular flange or rib, a circular groove and a circular series of regularly spaced lugs, a series of individually detachable spike teeth disposed between the said lugs with their inner ends abutting the said circular flange and their outer ends extending from the periphery of the disk, said teeth being withdrawable endwise between the disk lugs and each tooth having a lateral extension to engage the groove of the disk, and means comprising a ring for clamping the teeth rigidly to the disk.

4. The spike toothed head comprising in combination a disk having on one face a circular series of regularly spaced lugs and a circular groove concentric with said lugs and having an inclined or beveled side, a series of individually detachable spike teeth disposed between said lugs and extending from the periphery of the disk, each tooth having a beveled lateral extension engaging the beveled side of the groove of the disk, and means for clamping the teeth rigidly to the disk.

5. The spike toothed head comprising in combination, a disk having on one face a circular flange or rib, a circular groove outside said flange having a beveled or inclined side facing the flange, and a circular series of regularly spaced lugs, a series of individually detachable spike teeth disposed between said lugs with their inner ends abutting the said circular flange and their outer ends extending from the periphery of the disk, each tooth having a beveled lateral extension to engage the groove of the disk, and means for clamping the teeth rigidly against the disk.

In testimony whereof I affix my signature, in presence of two witnesses.

CHARLES E. WHITE.

Witnesses:
N. A. PETERSON,
J. V. LOCKHART.